(12) United States Patent
Lee et al.

(10) Patent No.: US 12,529,761 B2
(45) Date of Patent: Jan. 20, 2026

(54) SIGNAL SIMULATOR AND SIGNAL SIMULATION METHOD

(71) Applicant: HYUNDAI MOBIS CO., LTD., Seoul (KR)

(72) Inventors: Tae Yun Lee, Seongnam-si (KR); Do Yun Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 286 days.

(21) Appl. No.: 18/220,997

(22) Filed: Jul. 12, 2023

(65) Prior Publication Data

US 2024/0019543 A1 Jan. 18, 2024

(30) Foreign Application Priority Data

Jul. 14, 2022 (KR) .................. 10-2022-0086926

(51) Int. Cl.
*G01S 7/40* (2006.01)

(52) U.S. Cl.
CPC .................. *G01S 7/4095* (2021.05)

(58) Field of Classification Search
None
See application file for complete search history.

(56) References Cited

U.S. PATENT DOCUMENTS

| | | | | |
|---|---|---|---|---|
| 2,421,016 A | * | 5/1947 | Labin | G01S 7/40 342/174 |
| 2,781,511 A | * | 2/1957 | Pear, Jr. | G01S 7/40 342/172 |
| 3,308,461 A | * | 3/1967 | Wilbur | G01S 7/4021 342/169 |
| 4,107,681 A | * | 8/1978 | Robertson | G01S 13/345 342/135 |
| 4,121,213 A | * | 10/1978 | Bush | G01S 7/4052 342/172 |
| 4,523,196 A | * | 6/1985 | Gieraths | G01S 7/40 342/25 R |
| 4,730,191 A | * | 3/1988 | Groebke | G09B 9/54 434/2 |
| 5,164,734 A | * | 11/1992 | Fredericks | G01S 7/4052 342/187 |
| 5,300,934 A | * | 4/1994 | Asbell | G01S 7/4052 342/172 |
| 5,448,501 A | * | 9/1995 | Hablov | G01S 13/56 342/28 |
| 5,457,463 A | * | 10/1995 | Vencel | G01S 7/4052 342/170 |

(Continued)

FOREIGN PATENT DOCUMENTS

| KR | 10-2019-0101909 A | 9/2019 |
|---|---|---|
| KR | 10-2021-0023556 A | 3/2021 |
| KR | 10-2326781 B1 | 11/2021 |

*Primary Examiner* — Bernarr E Gregory
(74) *Attorney, Agent, or Firm* — Morgan Lewis & Bockius LLP

(57) ABSTRACT

A signal simulator and a signal simulation method are provided. A radar signal (electromagnetic wave) is received. The received electromagnetic wave is converted and the converted electromagnetic wave is transmitted. The electromagnetic wave may be converted based on a respiratory cycle. An electromagnetic signal reflected by respiration of a living creature is simulated to easily verify the biosignal sensing performance of a radar device.

19 Claims, 4 Drawing Sheets

(56) References Cited

U.S. PATENT DOCUMENTS

| | | | | |
|---|---|---|---|---|
| 5,518,400 | A * | 5/1996 | Otoide | G01S 7/4052 |
| | | | | 434/4 |
| 6,031,482 | A * | 2/2000 | Lemaitre | G01S 7/415 |
| | | | | 342/28 |
| 6,496,139 | B1 * | 12/2002 | Flacke | G01S 7/4052 |
| | | | | 342/171 |
| 7,782,250 | B2 * | 8/2010 | Shih | G01S 7/4052 |
| | | | | 342/170 |
| 10,852,394 | B2 * | 12/2020 | Salvesen | G01S 7/4052 |
| 11,994,614 | B2 * | 5/2024 | Paul | G01S 7/4065 |
| 2003/0164793 | A1 * | 9/2003 | Ludewig | G01S 7/4052 |
| | | | | 342/170 |
| 2004/0012517 | A1 * | 1/2004 | Abou-Jaoude | G01S 7/4052 |
| | | | | 342/171 |
| 2006/0267832 | A1 * | 11/2006 | Newberg | G01S 7/4052 |
| | | | | 342/195 |
| 2016/0377705 | A1 * | 12/2016 | Zack | G01S 7/414 |
| | | | | 342/21 |
| 2022/0171022 | A1 * | 6/2022 | Bourde | G01S 7/4095 |

* cited by examiner (a) Inhalation
(Expansion of chest)

(b) Exhalation
(Contraction of chest)

FIG. 4

| Frame   | 1 | 2  | 3  | 4  | 5  | 6  | 7  | 8 | 9 | 10 | 11 | 12 | 13 | 14 | 15 |
|---------|---|----|----|----|----|----|----|---|---|----|----|----|----|----|----|
| Doppler | 0 | -1 | -2 | -3 | -3 | -2 | -1 | 0 | 1 | 2  | 3  | 3  | 2  | 1  | 0  |

SIGNAL SIMULATOR AND SIGNAL SIMULATION METHOD

CROSS-REFERENCE TO RELATED APPLICATIONS

Pursuant to 35 U.S.C. § 119(a), this application claims the benefit of an earlier filing date and right of priority to Korean Application No. 10-2022-0086926, filed on Jul. 14, 2022, the contents of which are hereby incorporated by reference herein in their entirety.

TECHNICAL FIELD

The present embodiments relate to a signal simulator (or a simulation device) and a signal simulation method and, more particularly, to a signal simulator and a signal simulation method usable for the performance verification of a radar mounted on a vehicle.

BACKGROUND

A radar sensor used for a vehicle may be mounted inside or outside the vehicle to measure distance, speed, and angle with respect to a surrounding object (e.g., another vehicle or a structure). The measured data may be used to control the vehicle and may prevent vehicle accidents in the case of emergency or provide convenience information useful for driving by recognizing the driver.

Patent documents related to such a vehicular radar sensor include Korean Patent Registration No. 10-2326781 (Nov. 10, 2021), Korean Patent Publication No. 10-2021-0023556 (Mar. 4, 2021), and Korean Patent Publication No. 10-2019-0101909 (Sep. 2, 2019).

Recently, research on vehicular radar sensors is being conducted to easily sense a living creature (a human being or animal) that is relatively small in size and slow in speed. To commercialize this radar sensor, a procedure for verifying sensor performance during mass production is necessary. Therefore, there is a need for a device and method capable of simulating biosignals of a person or an animal in order to verify the performance of the sensor.

SUMMARY

An object of an embodiment of the present disclosure is to provide a signal simulator that converts a radar signal into a reflection signal similar to that in a real environment and radiates the converted reflection signal.

Another object of an embodiment of the present disclosure is to provide a signal simulator that generates a reflection signal for a radar signal by simulating a biosignal.

Another object of an embodiment of the present disclosure is to provide a signal simulator that generates a reflection signal for a radar signal based on biological characteristics of a living creature.

The objects to be achieved by the present disclosure are not limited to what has been particularly described hereinabove and other objects not described herein will be more clearly understood by persons skilled in the art from the following detailed description.

To achieve these objects and other advantages and in accordance with the purpose of the disclosure, as embodied and broadly described herein, a signal simulator includes a receiver configured to receive an electromagnetic wave transmitted by a vehicular radar sensor, a converter configured to convert the electromagnetic wave received from the receiver, and a transmitter configured to transmit the electromagnetic wave converted by the converter to the vehicular radar sensor. The converter is configured to convert the received electromagnetic wave based on a respiratory cycle.

The converter may convert a frequency of the received electromagnetic wave.

The converter may convert a wavelength of the received electromagnetic wave.

The respiratory cycle may be 3 to 5 seconds.

The converter may convert the received electromagnetic wave by increasing or decreasing the frequency or the wavelength of the received electromagnetic wave according to the respiratory cycle.

A cycle of increasing or decreasing the frequency or the wavelength of the received electromagnetic wave by the converter may be equal to the respiratory cycle.

In another aspect of the present disclosure, a signal simulator is configured to cyclically convert a wavelength or a frequency of an electromagnetic wave received from a vehicular radar sensor according to a respiratory cycle and radiate the converted electromagnetic wave.

In another aspect of the present disclosure, a signal simulator is configured to simulate and convert a Doppler effect according to respiration of a living creature with respect to an electromagnetic wave received from a vehicular radar sensor and then radiate the converted electromagnetic wave to the vehicular radar sensor.

In another aspect of the present disclosure, a signal simulation method includes receiving an electromagnetic wave from a vehicular radar sensor, converting the electromagnetic wave, and transmitting the converted electromagnetic wave to the vehicular radar sensor. The converting of the electromagnetic wave includes converting the electromagnetic wave based on a respiratory cycle.

The converting of the electromagnetic wave may include converting a wavelength or a frequency of the electromagnetic wave.

The converting of the electromagnetic wave may include converting the electromagnetic wave by increasing or decreasing the wavelength or the frequency of the electromagnetic wave according to the respiratory cycle.

The respiratory cycle may be 3 to 5 seconds.

The respiratory cycle may be equal to a cycle at which the wavelength or the frequency of the electromagnetic wave is increased or decreased.

In another aspect of the present disclosure, a signal simulation method includes setting a respiratory cycle of a specific living creature, setting a movement speed of a chest of the living creature according to a specific time interval within the respiratory cycle, calculating a wavelength and a frequency of an electromagnetic wave to which a Doppler effect is applied based on the movement speed of the chest, and converting an electromagnetic wave received from a radar sensor into an electromagnetic wave having the calculated wavelength and frequency.

According to an embodiment of the present disclosure, a biosignal similar to that in a real environment may be simulated.

According to an embodiment of the present disclosure, the biosignal sensing performance of a vehicular radar sensor may be easily verified by simulating a biosignal similar to that in a real environment.

The effects that are achievable by the present disclosure are not limited to what has been particularly described hereinabove and other advantages not described herein will be more clearly understood by persons skilled in the art from the following description.

BRIEF DESCRIPTION OF DRAWINGS

FIG. 4 is an exemplary diagram illustrating a Doppler frequency applied by a signal simulator in each frame according to an embodiment of the present disclosure.

DETAILED DESCRIPTION

Advantages and features of the present disclosure and methods to achieve the same will be apparent from the following detailed description of embodiments taken in conjunction with the accompanying drawings. The present disclosure may, however, be implemented in various different ways and should not be construed as being limited to the embodiments disclosed hereinbelow. Rather, the present embodiments are provided so that this disclosure will be through and complete, and will fully convey the concepts of the present disclosure to those of ordinary skill in the art, and the present disclosure is only defined by the accompanying claims and equivalents thereto.

Terms used in the present specification are used in order to describe embodiments, but are not intended to limit the scope of the present disclosure. As used in the present specification, a singular form may also include a plural form, unless otherwise defined contextually. Moreover, terms "comprise", "include", or "have" used in this specification specify the presence of stated elements but do not preclude the presence or addition of one or more other elements. Like numbers refer to like elements throughout the specification. As used herein, term "and/or" includes each and all combinations of one or more of elements mentioned. Terms such as "first" or "second" are used in order to describe a variety of elements, but it is apparent that such elements should not be limited to the scope of these terms. The terms are used solely for the purpose of distinguishing one element from another. Accordingly, it is apparent that a first element mentioned hereinbelow could be termed a second element, without departing from the scope of the present disclosure.

Unless otherwise defined, all terms (including technical and scientific terms) used herein have the same meaning as commonly understood by one of ordinary skill in the art to which the present disclosure belongs. Terms, such as those defined in commonly used dictionaries, are not to be interpreted in an idealized or overly formal sense unless expressly so defined herein.

Figure 1:
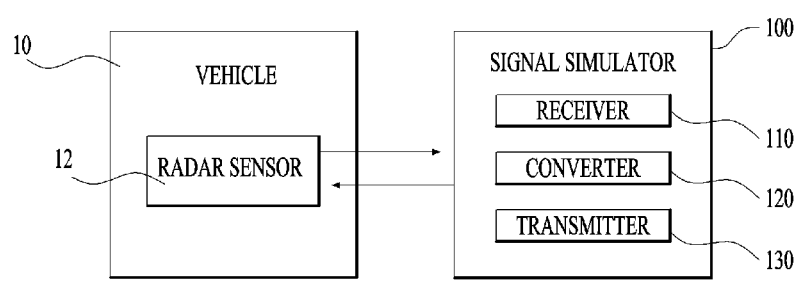
FIG. 1 illustrates a signal simulator and a radar sensor of a vehicle according to an embodiment of the present disclosure.

FIG. 1 illustrates a signal simulator 100 (hereinafter referred to as a "simulator") and a radar sensor 12 of a vehicle 10 according to an embodiment of the present disclosure. In the simulator 100 and a signal simulation method, an electromagnetic wave transmitted by the radar sensor 12 of the vehicle 10 may be received, the received electromagnetic wave may be converted (or modulated), and the converted electromagnetic wave may be sent back to simulate the sent signal for a specific object (e.g., a living creature such as a person or an animal).

Referring to FIG. 1, the simulator 100 includes a receiver 110, a converter 120, and a transmitter 130.

The receiver 110 may receive an electromagnetic wave transmitted by the radar sensor 12 of the vehicle 10. The converter 120 converts the electromagnetic wave received from the receiver 110. The transmitter 130 may transmit the electromagnetic wave converted by the converter 120.

The converter 120 may convert the received electromagnetic wave based on a respiratory cycle. Accordingly, the converter 120 may simulate a reflection wave reflected by a living creature. The converter 120 may convert the received electromagnetic wave in a manner of simulating a Doppler effect of an electromagnetic wave generated within the respiratory cycle with respect to the frequency or the wavelength of the received electromagnetic wave.

The respiratory cycle may be 3 to 5 seconds. A cycle at which the converter 120 converts the electromagnetic wave with respect to the frequency or the wavelength of the electromagnetic wave is the same as the respiratory cycle. The converter 120 may increase or decrease the frequency or the wavelength of the received electromagnetic wave within a set respiratory cycle. For example, when the set respiratory cycle is 3 seconds, the converter 120 may increase and then decrease the frequency or the wavelength of the received electromagnetic wave at a cycle of 3 seconds.

Figure 2:
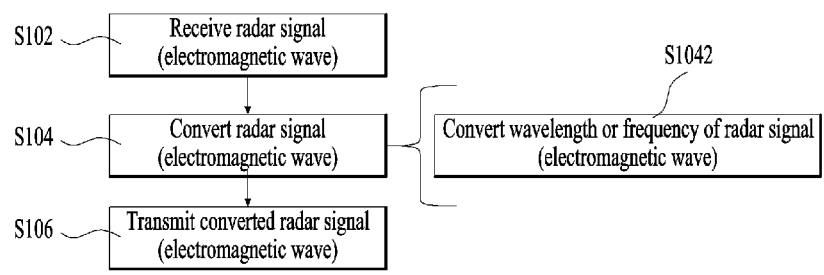
FIG. 2 is a flowchart illustrating a method of simulating and then sending back a biosignal by a signal simulator according to an embodiment of the present disclosure.

FIG. 2 is a flowchart illustrating a method of simulating and then sending back a biosignal by the simulator 100. In the simulator 100 or the signal simulation method of the simulator 100, the wavelength or the frequency of a radar signal (electromagnetic wave) may be converted in order to simulate a signal reflected by a living creature.

Referring to FIG. 2, the simulator 100 may receive a radar signal (electromagnetic wave) (S102), convert the radar signal (electromagnetic wave) (S104), and transmit the converted radar signal (S106). The radar signal may be converted by conversion of the wavelength or the frequency of the electromagnetic wave (S1042).

In FIG. 2, S102 may be performed by the receiver 110 of the simulator 100, S104 may be performed by the converter 120 of the simulator 100, and S106 may be performed by the transmitter 130 of the simulator 100.

Upon verifying the biosignal sensing performance of the radar sensor 12 of the vehicle 10, step S102 is performed to receive an electromagnetic wave from the radar sensor 12 of the vehicle 10 and step S106 is performed to transmit the converted radar signal to the radar sensor 12 of the vehicle 10.

When the electromagnetic wave transmitted by the radar sensor 12 is reflected by a living creature, the wavelength and frequency of the electromagnetic wave may change due to the Doppler effect caused by respiration of the living creature. When a person respires, the chest (or abdomen or back) of the person expands or contracts according to a respiratory cycle, and the wavelength and frequency of a reflection wave changes due to the Doppler effect according to expansion and contraction of the chest.

The simulator 100 may simulate the Doppler effect generated by the respiratory cycle of the living creature, convert the electromagnetic wave, and transmit the converted electromagnetic wave to the radar sensor 12. Therefore, the simulator 100 may configure a performance verification environment of the radar sensor 12 without relying on people or animals.

Figure 3:
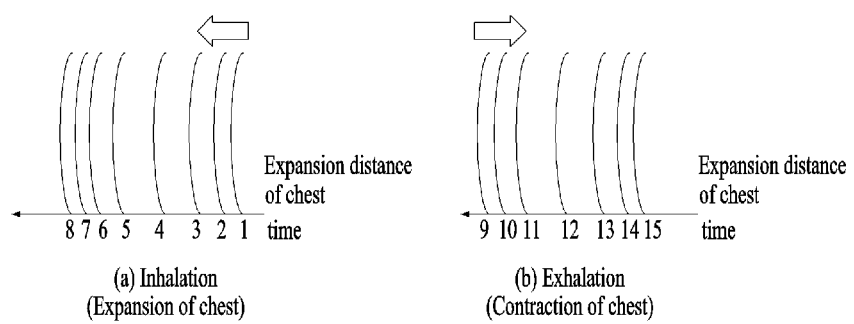
FIG. 3 is an exemplary diagram illustrating expansion or contraction of a chest as a respiratory time of a living creature elapses.

FIG. 3 is an exemplary diagram illustrating expansion or contraction of a chest according to a respiratory process of a living creature.

(a) of FIG. 3 illustrates that the chest expands while a person inhales. Referring to (a) of FIG. 3, at the beginning of inhalation (for example, when Time is 1, 2, or 3) and at the end of inhalation (for example, when Time is 6, 7, or 8), the expansion rate of the chest is relatively slow, and in the middle of inhalation (for example, when Time is 4 or 5), the expansion rate of the chest is fast. Accordingly, as the chest expands in the case of inhalation, the distance between the radar sensor 12 and the chest decreases. The decrease rate of the distance is slow at the beginning and end of inhalation and is fastest in the middle of inhalation.

(b) of FIG. 3 illustrates that the chest contracts while a person exhales. Referring to (b) of FIG. 3, at the beginning of exhalation (for example, when Time is 9 or 10) and at the end of exhalation (for example, when Time is 13, 14, or 15), the contraction rate of the chest is relatively slow, and in the middle of exhalation (for example, when Time is 11 or 12), the contraction rate of the chest is fast. Accordingly, as the chest contracts in the case of exhalation, the distance between the radar sensor 12 and the chest increases. The increase rate of the distance is slow at the beginning and end of exhalation and is fastest in the middle of exhalation.

The Doppler effect is a phenomenon in which the frequency and wavelength of a wave change depending on the relative speed of a source and an observer of the wave. Due to the change in relative speed between the radar sensor 12 and a living creature, generated by respiration (movement of a chest), the Doppler effect occurs in the electromagnetic wave transmitted by the radar sensor 12. The radar sensor 12 may sense whether an object onto which the electromagnetic wave is reflected is a living creature by interpreting a reflection signal in which the Doppler effect occurs. That is, the radar sensor 12 may sense whether the reflection signal is a biosignal.

The simulator 100 may convert a received radar signal (or electromagnetic wave) by interpreting the radar signal as a reflection signal in which the Doppler effect occurs by respiration. That is, the converter 120 of the simulator 100 may simulate the reflection signal generated by a living creature by increasing or decreasing the wavelength or the frequency of the radar signal (electromagnetic wave) according to the respiratory cycle of the living creature.

In this case, the respiratory cycle of the living creature may be set to 3 to 5 seconds. The respiratory cycle of the living creature may be calculated by the number of respirations per minute (12 to 20 respirations). One respiratory cycle includes one inhalation and one exhalation. In addition, the distance that the chest (or abdomen or back) moves due to respiration of the living creature may be assumed to be within 5 cm.

FIG. 4 is an exemplary diagram illustrating a Doppler frequency applied by the simulator 100 in each frame. A frame is a unit divided into regular time intervals. For example, a respiratory cycle of 3 seconds may be divided into 15 frames each having an interval of 200 milliseconds (ms).

Values corresponding to the frames of FIG. 4 may correspond to the time values of FIG. 3. Referring to FIG. 4, frames 1 to 8 represent an inhalation process. Accordingly, as the chest of a person expands, the distance between the radar sensor 12 and the chest decreases, and the decrease rate of the distance is the fastest in frame 4 or 5. Therefore, an absolute value of a Doppler frequency applied by the simulator 100 during the inhalation process is greatest in frame 4 or 5. That is, the frequency of the electromagnetic wave converted by the converter 120 may be the highest in frame 4 or 5, and the wavelength of the converted electromagnetic wave may be the shortest in frame 4 or 5.

In FIG. 4, frames 9 to 15 represent an exhalation process. Accordingly, as the chest of a person contracts, the distance between the radar sensor 12 and the chest increases, and the increase rate of the distance is the fastest in frame 11 or 12. Therefore, an absolute value of the Doppler frequency applied by the simulator 100 during the exhalation process is greatest in frame 11 or 12. The frequency of the electromagnetic wave converted by the converter 120 may be the smallest in frame 11 or 12, and the wavelength of the converted electromagnetic wave may be the longest in frame 11 or 12.

Electromagnetic wave conversion methods of the simulator 100 during the inhalation process and the exhalation process are opposite. Accordingly, Doppler values in frames 1 to 8 and Doppler values in frames 9 to 15 have opposite signs. In the case of the inhalation process, the converter 120 converts the frequency of the received electromagnetic wave to be high and the wavelength to be short, and in the case of the exhalation process, the converter 120 converts the frequency of the received electromagnetic wave to be small and the wavelength to be long. The degree of conversion of the electromagnetic wave may be greatest in a duration of a frame in which a distance change rate between the chest and the radar sensor 12 is the fastest.

The simulator 100 may simulate a biosignal of a specific living creature by converting the frequency or the wavelength of an electromagnetic wave based on the respiratory cycle of the living creature, the movement distance of the chest (or abdomen or back) of the living creature according to respiration, or the relative speed of the chest. An increment or decrement in frequency or wavelength may be calculated using the known Doppler effect formula. For example, the increment or decrement may be calculated using a difference between an original frequency of the electromagnetic wave and a frequency changed according to the Doppler effect. A wavelength or a frequency changed by the Doppler effect may be calculated using the known Doppler effect formula.

Accordingly, the simulator 100 may simulate a biosignal by converting the frequency or the wavelength of an electromagnetic wave using an increment or decrement calculated according to a defined time interval (or frame interval).

For example, in a signal simulation method, a respiratory cycle of a specific living creature is set and the set respiratory cycle is divided according to a specific time interval to set a movement speed of the chest of the living creature at each time. Accordingly, the expansion and contraction rate of the chest corresponding to a predetermined time interval within the set respiratory cycle is set. Then, the wavelength and frequency of an electromagnetic wave to which the Doppler effect is applied are calculated based on the set movement speed of the chest. In this case, the electromagnetic wave may refer to an electromagnetic wave transmitted by the radar sensor. Then, the wavelength and frequency to which the Doppler effect of the electromagnetic wave transmitted by the radar sensor is applied may be calculated based on the set speed of the chest and the relative speed of the radar sensor. In addition, the electromagnetic wave received from the radar sensor may be converted into an electromagnetic wave having the calculated wavelength and frequency. The converted electromagnetic wave may be transmitted to the radar sensor. The above signal simulation method may be performed by the simulator 100 according to an embodiment.

The simulator 100 according to an embodiment simulates the electromagnetic wave received from the radar sensor 12 to be similar to a biosignal. Therefore, when verifying the biosignal sensing performance of the radar sensor 12, an actual living creature is not required and thus a performance verification process is facilitated. In case of mass production of the radar sensor 12, an effect in verifying the performance of the mass-produced product is greatly enhanced.

In addition, the simulator 100 according to an embodiment may simulate a biosignal in various environments. A wide range of biosignals may be simulated by reflecting various respiratory cycles for respective living creatures and the rate of change in distance from the sensor according to respiration. Therefore, according to the simulator 100, the sensing performance of various biosignals by the radar sensor 12 may be easily verified.

The description of various embodiments of the present disclosure is not limited to the corresponding embodiments, and it is understood that the technical idea of each embodiment applied in various embodiments may be applied even to other embodiments.

As described above, the detailed description of the embodiments of the present disclosure has been given to enable those skilled in the art to implement and practice the disclosure. Although the disclosure has been described with reference to the embodiments, those skilled in the art will appreciate that various modifications and variations may be made in the present disclosure without departing from the spirit or scope of the disclosure and the appended claims. For example, those skilled in the art may use constructions disclosed in the above-described embodiments in combination with each other.

Accordingly, the present disclosure should not be limited to the specific embodiments described herein, but should be accorded the broadest scope consistent with the principles and features disclosed herein.

What is claimed is:

1. A signal simulator, comprising:
    a receiver configured to receive an electromagnetic wave transmitted by a vehicular radar sensor;
    a converter configured to convert the electromagnetic wave received from the receiver; and
    a transmitter configured to transmit the electromagnetic wave converted by the converter to the vehicular radar sensor,
    wherein the converter is configured to convert the received electromagnetic wave according to a respiratory cycle as a reflection signal to simulate the reflection signal.

2. The signal simulator of claim 1, wherein the converter is configured to convert a frequency of the received electromagnetic wave.

3. The signal simulator of claim 2, wherein the converter is configured to convert a wavelength of the received electromagnetic wave.

4. The signal simulator of claim 2 or claim 3, wherein the respiratory cycle is 3 to 5 seconds.

5. The signal simulator of claim 4, wherein the converter is configured to convert the received electromagnetic wave by increasing or decreasing the frequency or the wavelength of the received electromagnetic wave according to the respiratory cycle.

6. The signal simulator of claim 5, wherein the converter is configured to convert the received electromagnetic wave by increasing or decreasing the frequency or the wavelength of the received electromagnetic wave at a cycle which is the respiratory cycle.

7. The signal simulator of claim 1, wherein the signal simulator is configured to cyclically convert a wavelength or a frequency of the electromagnetic wave received from the vehicular radar sensor according to the respiratory cycle and radiate the converted electromagnetic wave.

8. The signal simulator of claim 1, wherein the signal simulator is configured to simulate and convert a Doppler effect according to respiration of a living creature with respect to the electromagnetic wave received from the vehicular radar sensor and then radiate the converted electromagnetic wave to the vehicular radar sensor.

9. The signal simulator of claim 8, wherein, in the simulating, the signal simulator is further configured for:
    setting the respiratory cycle of the living creature;
    setting a movement speed of a chest of the living creature for a predetermined time interval in the set respiratory cycle;
    calculating a wavelength and a frequency of the electromagnetic wave to which the Doppler effect is applied according to the set movement speed of the chest; and
    converting an electromagnetic wave received from a radar sensor into an electromagnetic wave having the calculated wavelength and frequency.

10. A signal simulation method, comprising:
    receiving an electromagnetic wave from a vehicular radar sensor;
    converting the electromagnetic wave; and
    transmitting the converted electromagnetic wave to the vehicular radar sensor,
    wherein the converting of the electromagnetic wave includes converting the electromagnetic wave according to a respiratory cycle as a reflection signal to simulate the reflection signal.

11. The signal simulation method of claim 10, wherein the converting of the electromagnetic wave includes converting a wavelength of the electromagnetic wave.

12. The signal simulation method of claim 11, wherein the converting of the electromagnetic wave includes converting a frequency of the electromagnetic wave.

13. The signal simulation method of claim 12, wherein the converting of the electromagnetic wave includes converting the electromagnetic wave by increasing or decreasing the wavelength or the frequency of the electromagnetic wave according to the respiratory cycle.

14. The signal simulation method of claim 13, wherein the respiratory cycle is 3 to 5 seconds.

15. The signal simulation method of claim 14, wherein the respiratory cycle is a cycle at which the wavelength or the frequency of the electromagnetic wave is increased or decreased.

16. The signal simulation method of claim 10, wherein the converting of the electromagnetic wave according to the respiratory cycle includes:
    cyclically converting a wavelength or a frequency of the electromagnetic wave received from the vehicular radar sensor according to the respiratory cycle and radiating the converted electromagnetic wave.

17. The signal simulation method of claim 10, further including:
    simulating and converting a Doppler effect according to respiration of a living creature with respect to the electromagnetic wave received from the vehicular radar sensor and then radiating the converted electromagnetic wave to the vehicular radar sensor.

18. The signal simulation method of claim 17, wherein the simulation includes:
    setting the respiratory cycle of the living creature;
    setting a movement speed of a chest of the living creature for a predetermined time interval in the set respiratory cycle;

calculating a wavelength and a frequency of the electromagnetic wave to which the Doppler effect is applied according to the set movement speed of the chest; and converting an electromagnetic wave received from a radar sensor into an electromagnetic wave having the calculated wavelength and frequency as the reflection signal to simulate the reflection signal.

19. A signal simulation method, comprising:

setting a respiratory cycle of a living creature;

setting a movement speed of a chest of the living creature for a predetermined time interval in the set respiratory cycle;

calculating a wavelength and a frequency of an electromagnetic wave to which a Doppler effect is applied according to the set movement speed of the chest; and converting an electromagnetic wave received from a radar sensor into an electromagnetic wave having the calculated wavelength and frequency as a reflection signal to simulate the reflection signal.

\* \* \* \* \*